(12) United States Patent
Sauer et al.

(10) Patent No.: US 7,400,496 B2
(45) Date of Patent: Jul. 15, 2008

(54) KEYBOARD ATTACHMENT ASSEMBLY FOR A COMPUTER DEVICE

(75) Inventors: Keith A. Sauer, Spring, TX (US); Marco Sixtus Ferrari, Houston, TX (US); George A. Bold, Spring, TX (US); George S. Waybright, Conroe, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 11/173,265

(22) Filed: Jul. 1, 2005

(65) Prior Publication Data

US 2007/0002025 A1   Jan. 4, 2007

(51) Int. Cl.
*G06F 1/16* (2006.01)

(52) U.S. Cl. .................. 361/680; 381/309; 345/169

(58) Field of Classification Search ......... 345/168–169; 381/74, 309; 439/136, 916; 343/702; 361/679–687, 361/724–727
See application file for complete search history.

(56) References Cited

U.S. PATENT DOCUMENTS

| | | | | |
|---|---|---|---|---|
| 5,400,055 | A * | 3/1995 | Ma et al. | 345/168 |
| 5,410,333 | A | 4/1995 | Conway | |
| 5,510,953 | A * | 4/1996 | Merkel | 361/680 |
| 5,548,477 | A | 8/1996 | Kumar et al. | |
| 6,108,200 | A | 8/2000 | Fullerton | |
| 6,507,336 | B1 | 1/2003 | Lunsford | |
| 6,599,143 | B1 * | 7/2003 | Chong et al. | 439/247 |
| 6,671,170 | B2 | 12/2003 | Webb et al. | |
| 6,785,126 | B2 | 8/2004 | Hazzard et al. | |
| 6,803,904 | B2 * | 10/2004 | Furuki et al. | 345/168 |
| 2005/0035950 | A1 * | 2/2005 | Daniels | 345/169 |

* cited by examiner

*Primary Examiner*—Hung V Duong

(57) ABSTRACT

A keyboard attachment assembly for a computer device comprises a keyboard having a variably positionable connector and an adapter releasably couplable to the keyboard. The adapter comprises an alignment mechanism for moving the connector into alignment with a connector port of the computer device.

29 Claims, 2 Drawing Sheets

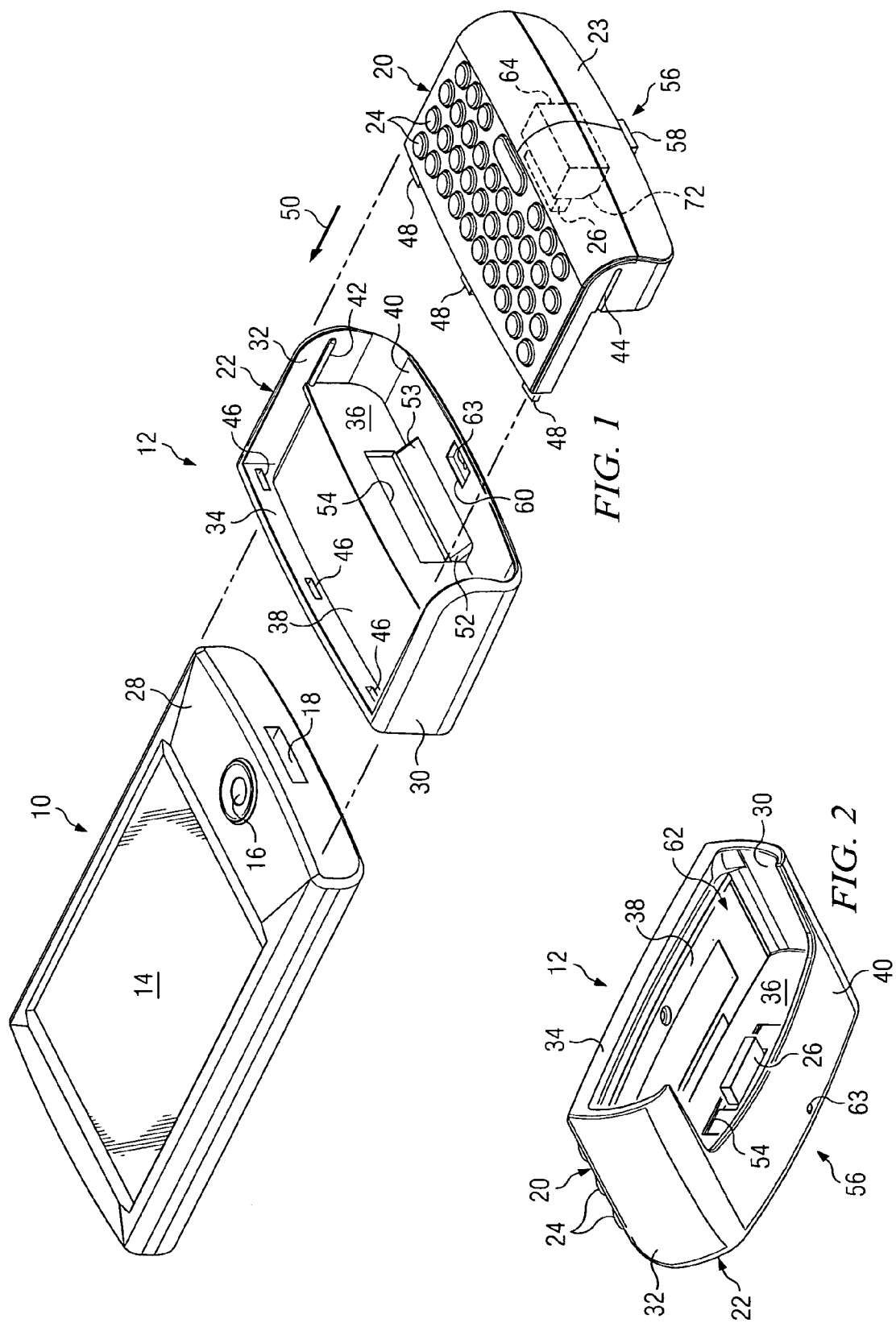

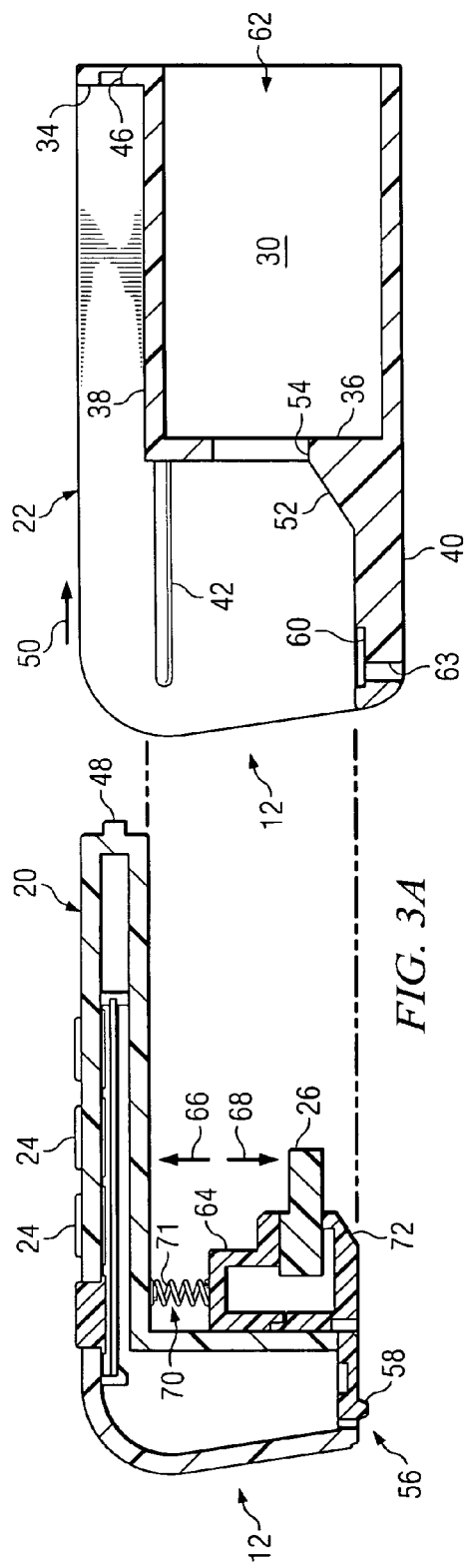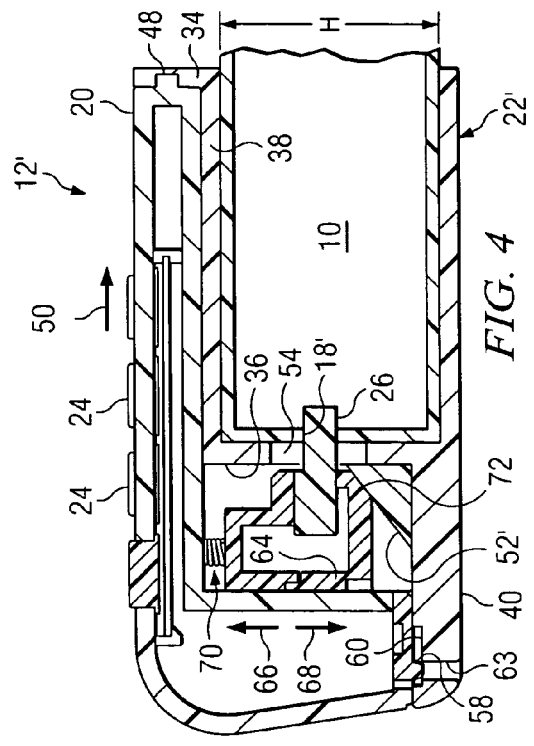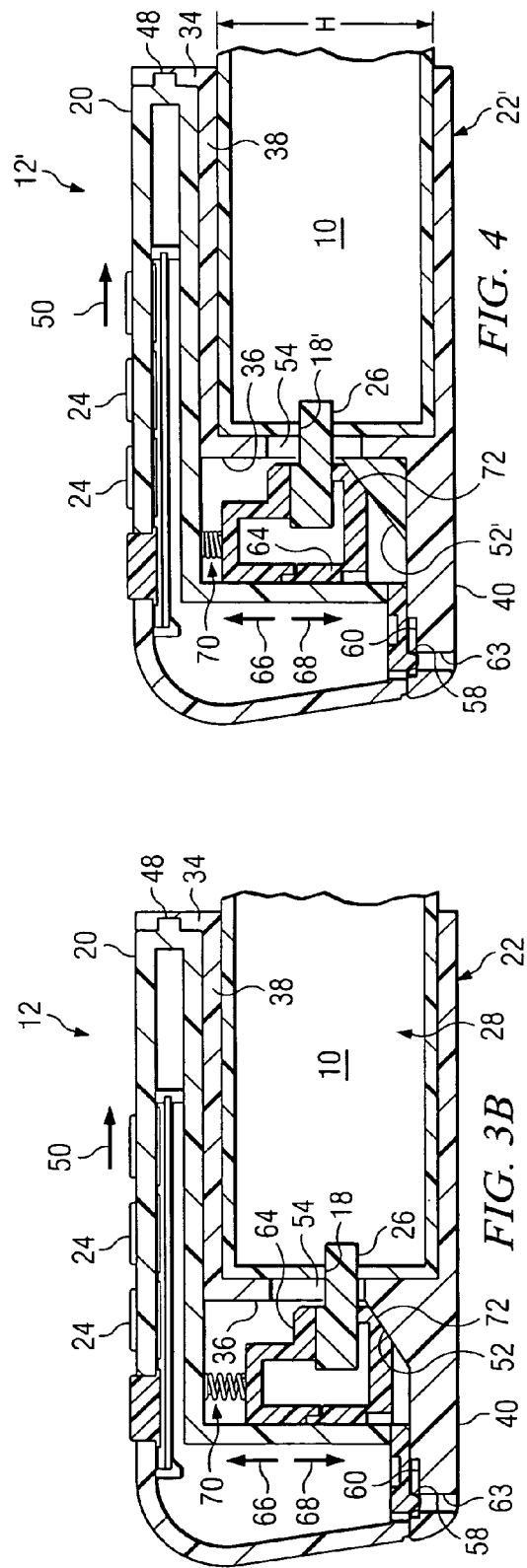

KEYBOARD ATTACHMENT ASSEMBLY FOR A COMPUTER DEVICE

BACKGROUND OF THE INVENTION

Computing devices (e.g., handheld and other types of computer devices) are designed to be lightweight and easily carried. Because of the small size and portability of such computing devices, strict adherence to hardware constraints, such as input device hardware constraints, must be maintained. Computing devices employ a touch pad or handwriting recognition area to enable a user to provide input to the computer. However, because of the small size of such computers, data input in an efficient and ergonomic manner is oftentimes difficult and cumbersome. Detachable keyboards have been utilized to provide an additional data input device for the computer. However, incompatibility between particular detachable keyboards and particular computers results in further increased costs associated with designing, shipping and stocking different detachable keyboards.

BRIEF DESCRIPTION OF THE DRAWINGS

For a more complete understanding of the present invention, and the objects and advantages thereof, reference is now made to the following descriptions taken in connection with the accompanying drawings in which:

FIG. 1 is a front perspective exploded view of an embodiment of a keyboard attachment assembly in accordance with the present invention;

FIG. 2 is a bottom perspective view of the keyboard attachment assembly embodiment illustrated in FIG. 1;

FIG. 3A is an exploded section view of the keyboard attachment assembly embodiment illustrated in FIG. 1;

FIG. 3B is an assembled section view of the keyboard attachment assembly embodiment illustrated in FIG. 1; and FIG. 4 is a section view of another embodiment of a keyboard attachment assembly in accordance with the present invention.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

FIG. 1 is a diagram illustrating a computer device 10 with which an embodiment of a keyboard attachment assembly 12 in accordance with the present invention is employed to advantage. In the embodiment illustrated in FIG. 1, computer device 10 includes a display 14 for providing graphical user interface features, a command button 16 and a connector port 18 for connecting computer device 10 with keyboard attachment assembly 12. However, it should be understood that computer device 10 may comprise other and/or additional features or elements. Computer device 10 may comprise a handheld computer device or other type of portable computer device.

In the embodiment illustrated in FIG. 1, keyboard attachment assembly 12 comprises a keyboard 20 releasably couplable to an adapter 22. Keyboard 20 comprises a housing 23, keypad buttons 24 and a connector 26 for attachment to connector port 18 of computer device 10 to enable communicative coupling therebetween. Adapter 22 is configured to be removably couplable to an end 28 of computer device 10 for engagement therewith to facilitate engagement of keyboard 20 with computer device 10. Adapter 22 is configured to enable engagement of keyboard 20 to a plurality of different types and/or models of computer devices 10. Connector 26 is configured to be movable relative to housing 23 of keyboard 20 to enable engagement of connector 26 with connector port 18 of the plurality of different computer devices 10.

In the embodiment illustrated in FIG. 1, adapter 22 comprises sidewalls 30 and 32, a front wall 34, a transverse wall 36, a top wall 38 and a bottom wall 40, all or at least a portion thereof preferably configured to support keyboard 20. Sidewalls 30 and 32 each comprise a rib 42 adapted to engage a corresponding slot 44 disposed on keyboard 20 to align keyboard 20 with adapter 22. However, it should be understood that other methods and/or elements may be used to align keyboard 20 with adapter 22. In the embodiment illustrated in FIG. 1, front wall 34 comprises a plurality of recessed areas 46 configured to receive and cooperate with tabs 48 disposed on keyboard 20 to secure keyboard to adapter 22 by limiting and/or otherwise preventing movement of keyboard 20 relative to adapter 22 when keyboard 20 is disposed in adapter 22.

In operation, keyboard 20 is coupled to adapter 22 by moving keyboard 20 in the direction of arrow 50 relative to adapter 22 until tabs 48 are inserted within recessed areas 46. As keyboard 20 is moved in the direction of arrow 50, an alignment mechanism 52 of adapter 22 is configured to move connector 26 to support and facilitate alignment of connector 26 with an opening 54 disposed in transverse wall 36 and facilitate insertion of connector 26 therethrough. Adapter 22 is configured such that when keyboard 20 is coupled to adapter 22, alignment mechanism 52 automatically positions connector 26 for alignment with connector port 18 of a corresponding computer device 10 when attachment assembly 12 is coupled to computer device 10. In some embodiment illustrated in FIG. 1, alignment mechanism 52 comprises a ramp 53. However, it should be understood that other methods and/or devices may be used to support and/or move connector 26 into a desired alignment position. In some embodiments of the present invention, alignment mechanism 52 is formed molded or integral with adapter 22 (i.e., formed as a single, continuous or unitary structure). However, in other embodiments of the present invention, alignment mechanism 52 is configured to be separately attachable to adapter 22, thereby facilitating interchangeability thereof (e.g., different sizes and/or shapes of alignment mechanism 52) by the user to accommodate attachment of keyboard 20 to a plurality of different computer devices 10.

Connector 26 is movable to enable keyboard 20 to adapt to a wide array of computer devices 10 having differently positioned connector ports 26 (e.g., different models of computer devices 10 and/or computer devices 10 of different providers or manufacturers). For example, adapter 22 is adapted to be configured having differently sized and/or shaped alignment mechanism 52 (e.g., a correspondingly taller or shorter ramp 53) to align connector 26 with connector port 18. In some embodiments of the present invention, a separate adapter 22 is provided with a correspondingly configured alignment mechanism 52 for different computer devices 10. However, in other embodiment of the present invention, adapter 22 is configured having a removable alignment mechanism 52, thereby facilitating detachment therefrom and replacement therewith of another alignment mechanism 52 (e.g. a correspondingly taller or shorter ramp 53) corresponding to a particular computer device 10. Thus, in operation, connector 26 is configured to be variably positionable (e.g., variably positionable relative to housing 23 or another portion of keyboard 20) to enable movement thereof into alignment with a connector port 18 of a corresponding computer device 10.

In the embodiment illustrated in FIG. 1, a locking mechanism 56 is used to securely and releasably couple keyboard 20 to adapter 22. Locking mechanism 56 comprises a button 58 for cooperatively engaging a recessed area 60 formed on bottom wall 40 of adapter 22. Walls 30, 32, 34, 36 and 38 and locking mechanism 56 restrict relative movement between keyboard 20 and adapter 22 when keyboard 20 is coupled to adapter 22. To facilitate removal of keyboard 20 from adapter 22, an object (e.g., a pointed device such as an end of a paper clip or ballpoint pen) is inserted through an opening 63 extending through bottom wall 40 to recessed area 60 to disengage button 58 from recessed area 60. After disengagement of button 58 from recessed area 60, a separation force may be applied to keyboard 20 in a direction opposite that indicated by arrow 50 to disengage keyboard 20 from adapter 22. However, it should be understood that other methods and/or elements may be used to facilitate disengagement of keyboard 20 from adapter 22 (e.g., automatic release in response to actuation or depression of button 58 or another mechanism).

FIG. 2 is a diagram illustrating a bottom view of keyboard attachment assembly 12 in accordance with the present invention. In the embodiment illustrated in FIG. 2, sidewalls 30 and 32, transverse wall 36 and top wall 38 form a chamber 62 sized to receive end 28 of computer device 10 (FIG. 1). Insertion of end 28 into chamber 62 causes engagement of connector 26 with connector port 18 (FIG. 1) to communicatively couple computer device 10 to keyboard 20.

FIG. 3A is a diagram illustrating an exploded section view of keyboard 20 detached from adapter 22. In the embodiment illustrated in FIG. 3A, connector 26 is mounted on a movable member 64. Movable member 64 is configured to move in the directions indicated by arrows 66 and 68 to enable variable positioning of connector 26. The movement of member 64 enables keyboard 20 to adapt to differing models of computer devices 10 (e.g., computer devices 10 having a different position of connector ports 18). In the embodiment illustrated in FIG. 3A, a biasing mechanism 70, such as a linear spring 71, biases movable member 64 in the direction indicated by arrow 68. In the embodiment illustrated in FIG. 3A, movable member 64 comprises an angled portion 72 configured complementary to alignment mechanism 52 to enable sliding engagement therebetween when keyboard 20 is moved in the direction of arrow 50 relative to adapter 22 to attach keyboard 20 to adapter 22. In operation, as keyboard 20 is moved in the direction of arrow 50 relative to adapter 22, angled portion 72 slideably engages alignment mechanism 52, thereby compressing biasing mechanism 70 and causing movable member 64 to move in the direction of arrow 66. Movable member 64 and/or alignment mechanism 52 are preferably configured such that when keyboard 20 is coupled to adapter 22, connector 26 is moved in the direction 66 a predetermined amount to align connector 26 with a corresponding connector port 18 of computer device 10.

FIG. 3B is a diagram illustrating an assembled view of keyboard attachment assembly 12. In the embodiment illustrated in FIG. 3B, tabs 48 are disposed within recessed areas 46 and button 58 is disposed within recessed area 60 to securely couple keyboard 20 to adapter 22. Angled portion 72 of movable member 64 is supported by alignment mechanism 52 so that connector 26 is positioned to extend through opening 54. Alignment mechanism 52 is configured to raise moveable member 64 in the direction indicated by arrow 66 a predetermined amount to automatically align connector 26 with connector port 18, thereby facilitating automatic engagement of connector 26 with connector port 18 when attachment assembly 12 is connected to computer device 10.

FIG. 4 is a diagram illustrating another embodiment of a keyboard attachment assembly 12' in accordance with the present invention. In the embodiment illustrated in FIG. 4, an adapter 22' is illustrated comprising a replaceable and/or interchangeable alignment mechanism 52' to accommodate a differently positioned connector port 18' associated with a particular computer device 10. For example, in the embodiment illustrated in FIG. 4, alignment mechanism 52' is configured having a greater dimension in the directions 66 and 68 than alignment mechanism 52 illustrated in FIGS. 3A and 3B to locate connector 26 in a different position to accommodate a position of connector port 18'. It should also be understood that alignment element 52' may be configured having a smaller dimension in the directions 66 and 68 than alignment mechanism 52 illustrated in FIGS. 3A and 3B to facilitate less movement of connector 26 in the direction 66. Alignment mechanism 52' is releasably couplable to adapter 22' using fasteners, adhesive, hook and loop elements, snap-fit or any other type of attachment mechanism or method.

Thus, embodiments of the present invention provide a keyboard attachment assembly 12 that enables use of a detachable keyboard 20 with a plurality of different computer devices 10, thereby reducing costs associated with developing different keyboards for each model of computer device 10 or computer devices 10 provided by different manufacturers. Further, embodiments of the present invention enable interchangeability of an adapter 22 (e.g., alignment mechanism 52) to accommodate a plurality of different computer devices 10. For example, FIGS. 1-3B illustrate a single embodiment of assembly 12 configured to facilitate attachment of keyboard 20 with a particular device 10 based on the size and configuration of alignment mechanism 52 (e.g., a particular model of device 10). It should be understood that assembly 12 may be otherwise configured to facilitate attachment of keyboard 20 with other devices 10 (e.g., other models of device 10) by configuring alignment mechanism 52 differently. Thus, in operation, a plurality of different assemblies 12 may be provided and/or otherwise supplied with a particular keyboard 20 where each supplied assembly 12 is configured corresponding to a different model and/or configuration of computer device 10. Alternatively, for example, FIG. 4 illustrates assembly 12 configured to accommodate interchangeability of alignment mechanism 52 to accommodate different models and/or configurations of computer devices 10. Thus, in operation, considering the embodiment illustrated in FIG. 4, a single adapter 22 may be provided and/or supplied with a plurality of differently configured alignment mechanisms 52 to accommodate interchangeability of at least one of such alignment mechanisms 52 corresponding to a particular computer device 10 the user desires to attach to keyboard 20.

What is claimed is:

1. A keyboard attachment assembly for a computer device, comprising:
    a keyboard having a variably positionable connector; and
    an adapter releasably couplable to the keyboard, the adapter comprising an alignment mechanism for moving the connector into alignment with a connector port of the computer device.

2. The keyboard attachment assembly of claim 1, wherein the alignment mechanism comprises a ramp.

3. The keyboard attachment assembly of claim 1, wherein the alignment mechanism is releasably couplable to the adapter.

4. The keyboard attachment assembly of claim 1, wherein the keyboard comprises a movable member coupled to the connector.

5. The keyboard attachment assembly of claim 1, wherein the keyboard comprises a movable member adapted to engage the alignment mechanism.

6. The keyboard attachment assembly of claim 1, wherein the keyboard comprises a biasing mechanism coupled to the alignment mechanism.

7. The keyboard attachment assembly of claim 1, further comprising a locking mechanism adapted to releasably couple the keyboard to the adapter.

8. The keyboard attachment assembly of claim 1, wherein the keyboard comprises a movable member adapted to slideably engage the alignment mechanism to align the connector with the connector port.

9. The keyboard attachment assembly of claim 1, wherein the adapter is releasably couplable to at least a portion of the computer device.

10. The keyboard attachment assembly of claim 1, wherein the adapter comprises a chamber adapted to receive at least a portion of the computer device.

11. An interchangeable keyboard attachment assembly for a computer device, comprising:
   a keyboard having a variably positionable connector; and
   an adapter adapted to receive a plurality of different alignment mechanisms to align the variably positionable connector with a connector port corresponding to plurality of different computer devices.

12. The interchangeable keyboard attachment assembly of claim 11, wherein the plurality of different alignment mechanisms comprises a plurality of different ramps.

13. The interchangeable keyboard attachment assembly of claim 11, wherein the keyboard comprises a movable member coupled to the connector.

14. The interchangeable keyboard attachment assembly of claim 11, wherein the keyboard comprises a movable member adapted to engage a corresponding alignment mechanism to align the connector with the respective connector port.

15. The interchangeable keyboard attachment assembly of claim 11 wherein the keyboard comprises a biasing mechanism coupled to the connector.

16. The interchangeable keyboard attachment assembly of claim 11, further comprising a locking mechanism adapted to releasably couple the keyboard to the adapter.

17. The interchangeable keyboard attachment assembly of claim 11, wherein the adapter is releasably couplable to at least a portion of the computer device.

18. The interchangeable keyboard attachment assembly of claim 11, wherein the adapter comprises a chamber adapted to receive at least a portion of the computer device.

19. A method of manufacturing a keyboard attachment assembly for a computer device, comprising:
   providing a keyboard having a variably positionable connector; and
   providing an adapter releasably couplable to the keyboard, the adapter having an alignment mechanism for moving the connector into alignment with a connector port of the computer device.

20. The method of claim 19, wherein providing an adapter comprises providing an adapter configured to receive at least a portion of the computer device.

21. The method of claim 19, wherein providing a keyboard comprises providing a keyboard having a biasing mechanism coupled to the connector.

22. The method of claim 19, wherein providing a keyboard comprises providing a keyboard having a movable member coupled to the connector.

23. The method of claim 19, wherein providing a keyboard comprises providing a keyboard having a movable member adapted to engage a corresponding alignment mechanism to align the connector with a respective connector port.

24. A keyboard attachment assembly for a computer device, comprising:
   a means for releasably coupling a keyboard to the computer device; and
   a means, disposed in the coupling means, for moving a variably positionable connector of the keyboard into alignment with a connector port of the computer device.

25. The keyboard attachment assembly of claim 24, wherein the means for moving the variably positionable connector comprises means for engaging a movable member of the keyboard.

26. The keyboard attachment assembly of claim 24, further comprising a biasing means coupled to the connector.

27. The keyboard attachment assembly of claim 24, wherein the means for moving the variably positionable connector comprises an interchangeable positioning means.

28. A keyboard, comprising:
   a variably positionable connector for communicatively engaging a connector port of a plurality of different computer devices; and
   a member coupled to the connector for variably positioning the connector into alignment with a corresponding connector port, wherein the member is adapted to engage an alignment mechanism of an adapter to align the connector with a corresponding connector port.

29. The keyboard of claim 28, further comprising a biasing mechanism coupled to the connector.

* * * * *